UNITED STATES PATENT OFFICE.

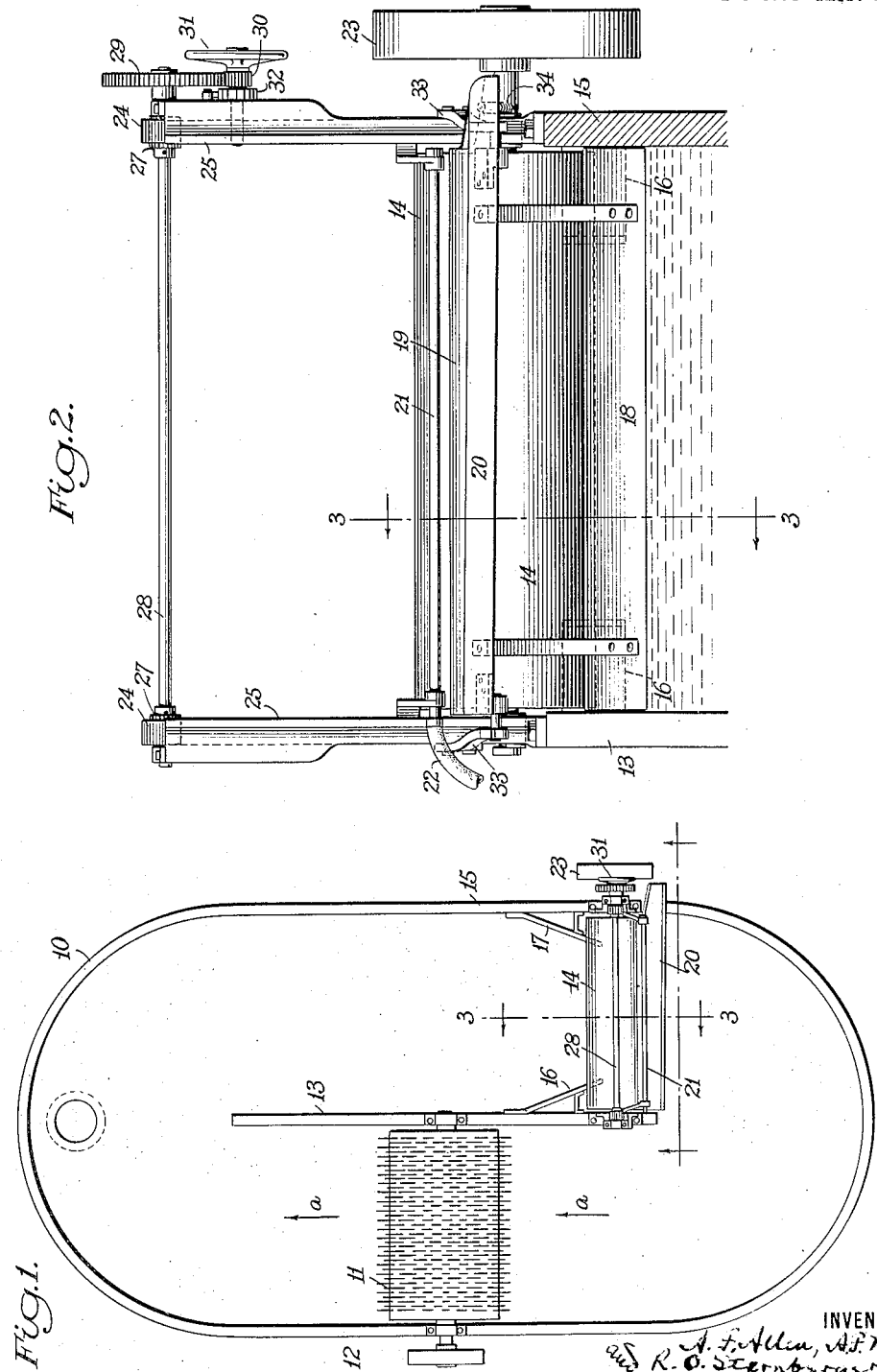

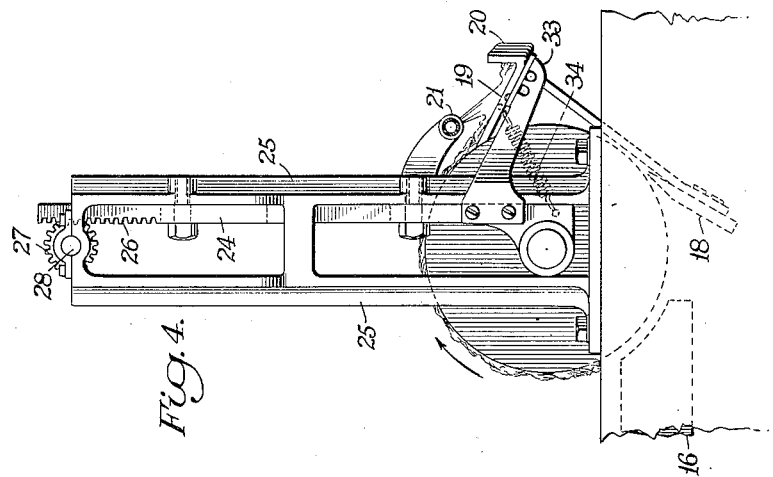
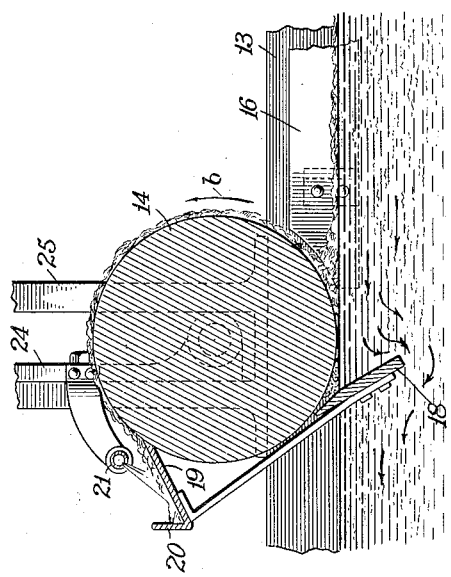

ARTHUR F. ALLEN AND ALFRED F. McCOY, OF NEW YORK, N. Y., AND ROBERT O. STERNBERGER, OF NEWARK, NEW JERSEY, ASSIGNORS TO TIDEWATER PAPER MILLS COMPANY, OF BROOKLYN, NEW YORK, A CORPORATION OF NEW YORK.

REMOVING PRINTER'S INK FROM PAPER.

1,406,322.   Specification of Letters Patent.   Patented Feb. 14, 1922.

Application filed December 22, 1920. Serial No. 432,389.

*To all whom it may concern:*

Be it known that we, ARTHUR F. ALLEN, ALFRED F. McCOY, and ROBERT O. STERNBERGER, all citizens of the United States of America, residing at, respectively, New York, county and State of New York, New York, Kings County, State of New York, and Newark, Essex County, State of New Jersey, have invented certain new and useful Improvements in Removing Printers' Ink from Paper, of which the following is a full, clear, and exact description.

This invention relates to the removal of printers' ink from waste paper and the like, and its chief object is to provide an effective method for the purpose, which can be carried out at reasonable cost with the use of apparatus of simple character. To these and other ends the invention consists in the novel features hereinafter described.

In the preferred practice of the invention our method comprises treating the waste paper, during or after maceration, with a suitable alkali, and at a later stage treating the stock so produced with an emulsifying agent, preferably soap. The object of the first mentioned treatment is to separate the oil of the ink from the fibre of the paper, and any suitable alkali may be used, but we have found that commercial sodium carbonate, commonly known as soda ash, is both effective and cheap for the purpose. Among the other alkalis that may be used we have found caustic soda to be especially suitable. In the second treatment referred to, the oil of the ink is more or less emulsified and caused to rise to the surface of the stock in the form of soapy bubbles, usually darkened or dirty in appearance by reason of the pigment carried with them. In some cases substantially all of the pigment is eliminated in this manner, and in other cases some of the pigment remains in the stock. Usually, however, the carbon or other pigment remaining is not sufficient to seriously impair the quality of the paper which is later produced from the pulp.

Suitable and convenient apparatus for our method is illustrated in the accompanying drawing, in which—

Fig. 1 is a plan view, somewhat diagrammatic in character, of a beating engine of conventional type equipped with our novel skimming mechanism for removing the oil and other matters from the surface of the stock.

Fig. 2 is a front view of the skimming mechanism.

Fig. 3 is a cross section on line 3—3 of Figs. 1 and 2.

Fig. 4 is a side view of the skimming mechanism from the left of Fig. 2.

In carrying out the invention in the preferred manner the waste paper, for example waste printed news-print paper, is macerated in any convenient manner, as for example in an ordinary beating engine, 10, or the paper may be shredded by other means and the stock then transferred to the beating engine.

The consistency of the stock in the beater may vary considerably but we have found that good results are obtained with a 6 per cent consistency; that is, a consistency such that the paper or fiber is about 6 per cent of the total mass. It is also desirable to have the temperature as high as possible without causing injury to the fibres, and our experience indicates that about 140° F. is best for the purpose.

To the hot stock in the beating engine there is added enough soda ash or other alkali to give the whole a decided alkalinity, the amount of alkali depending upon the nature of the alkali itself, the kind of water used, etc. After beating for a short time, say from ten minutes to half an hour, sufficient soap, preferably ordinary laundry soap in chipped or granular form, is added to the mixture or stock to form a saturated solution, and the beating is continued until the oil of the ink is thoroughly emulsified. At this stage sufficient cold water is added to bring the consistency of the stock down to about 3 per cent and to reduce the temperature to about 100° F. The effect of adding the cold water is not only to thin down the stock but also to throw more or less of the soap out of solution, with the result that as the agitation or beating continues the emulsified soap, oil and pigment will rise to the top in the form of dark soapy bubbles. These may be removed from the surface of the stock as it flows around the beater by any convenient means, as for example by rotary washing screens but preferably by the rotary skimming mechanism illustrated. The beating engine 10 has a beating roll 11 arranged transversely between the side wall 12 and the midfeather 13, the direction of movement of the stock being indicated by the two arrows a, a. The skimming mechanism for removing the bubbles from the stock may be located at any convenient point where the surge or wave produced by the beating roll is not too great, but preferably at the end of the midfeather just before the stock flows around the end of the latter in its travel toward the roll. The mechanism mentioned comprises a roller 14 preferably made of wood, extending between the midfeather 13 and the opposite side wall 15, the skimming roll being arranged in such position that its underside just touches or is but slightly above the surface of the stock. In front of the skimming roller are two inclined deflectors 16, 17, extending under the roller as indicated in Fig. 3, for the purpose of concentrating the bubbles toward the center of the roller. Beyond the roller is a dam 18 extending transversely across the channel between the midfeather and the side wall, and preferably inclined as indicated in Fig. 3, with its upper edge close to the roller 14. The dam extends down a short distance into the stock, so that its effect will be to cause the stock itself to flow down and under the dam, while the bubbles, trapped by the dam, and brought into contact with the underside of the roller, may adhere to the latter and be carried upwardly in the direction of the arrow b, Fig. 3. Across the roller at a suitable point below the top thereof is a doctor 19 in close contact with the roller, so that the bubbles will be scraped off of the same as the roller revolves. The doctor is inclined, as indicated, and at its lower edge is a backstrip 20 forming a trough. The trough thus provided is slightly inclined so that the oil, pigment and other matters will tend to flow down the same and out over the side of the wall 15, where they can be discharged. To facilitate this flow of the material, a spray pipe 21 is provided, extending across the doctor at a slight distance above the same and connected at one end, as 22, with a source of water under pressure. The pipe has a series of perforations on its underside, so that the water is discharged in the form of jets upon the doctor to wash down the material scraped thereby from the skimming roller.

The skimming roller 14, rotated by the pulley 23, is journaled at the bottom of two frames 24 which are themselves vertically movable in side frames 25 mounted on the side wall 15 and the midfeather 13. The frames 24 are provided with rack teeth 26 meshing with pinions 27 on a transverse shaft 28 suitably mounted in the frames 25 at or near the top thereof. The shaft just mentioned can be rotated to raise and lower the adjustable frames 24 by means of a gear 29 and a pinion 30, the latter being rotated by a hand-wheel 31. A ratchet and pawl mechanism 32, associated with the hand-wheel 31 and pinion 30, prevents descent of the frames 24 by gravity after they have been adjusted to the desired position. The dam 18, doctor 19, and spray pipe 21 are all carried by the frames 24, and it will therefore be seen that the positions of the parts mentioned relative to each other are always maintained, as the roll is raised or lowered to bring its underside into proper position with respect to the surface of the stock in the beater. It will of course be understood that the connection of the spray pipe 21 to the source of water under pressure is of a kind, as for example a flexible hose, to permit this vertical movement of the parts. The doctor 19 may be pivotally mounted on the brackets 33, with a spring 34 at one or both ends to keep it in suitably close contact with the roll as the parts wear way. Preferably the doctor is made of a material which will take most of the wear, since it is more easily and more cheaply replaceable than the roller.

During or after the skimming operation the pulp is given a change of water, say with ordinary rotary washing screens, to remove as much as possible of any remaining soap and alkali and other foreign matter.

After the stock has been cleansed by skimming and washing as described, it may be formed into standard pulp laps on an ordinary "wet machine", or it may have added to it in the beater such color and mordant as may be desirable, and may then be run directly to the paper machine. For some purposes it may be mixed with new pulp in any desired proportion, say half and half.

We have found in using caustic soda in place of or in admixture with soda ash that the oils and pigments rise to the surface of the stock less freely than with soda ash alone. In such case the desired removal of the oils, pigments, and other foreign matters may be accomplished wholly or in part by means of ordinary rotary washing screens attached directly to the beater.

The amount of alkali needed to give the desired alkalinity in the first stage of the process may be found to vary in different localities, due to the difference in waters. A hard water containing carbonates and other salts will require more alkali, and soft water, that is water which does not contain the impurities mentioned, will require less of the alkali.

The apparatus described is not claimed herein but forms the subject of our copending application Serial No. 471,223 filed May 20, 1921.

It is to be understood that the invention is not limited to the procedure herein specifically described but can be practiced in other ways without departure from its spirit.

We claim:

1. In the art of removing ink from printed paper, the improvement comprising treating the macerated paper with an alkali solution to separate the oil and pigment of the ink from the fibre, and agitating the stock in a solution of soap to emulsify the oil.

2. In the art of removing ink from printed paper, the improvement comprising agitating the macerated paper in a solution containing an agent capable of separating the oil and pigment of the ink from the fibre, agitating the stock in an emulsifying solution to emulsify the oil, and removing the latter.

3. In the art of removing ink from printed paper, the improvement comprising treating the macerated paper with a solution containing an agent capable of separating the oil and pigment of the ink from the fibre, agitating the stock in admixture with an emulsifying agent to emulsify the oil, removing the latter, and washing the stock.

4. In the art of removing ink from printed paper, the improvement comprising treating the macerated paper with an alkali solution to separate the oil and pigment of the ink from the fibre, agitating the stock in a solution of soap to emulsify the oil, and removing the soap and emulsified oil.

5. In the art of removing ink from printed paper, the improvement comprising treating the macerated paper with an alkali solution to separate the oil and pigment of the ink from the fibre, agitating the stock in a solution of soap whereby the oil is carried to the surface in the form of bubbles, and removing the bubbles.

6. In the art of removing ink from printed paper, the improvement comprising agitating the paper in an alkali solution to separate the oil and pigment of the ink from the fibre, emulsifying the oil and causing the same to rise to the surface of the stock in the form of bubbles, removing the bubbles, and washing the stock.

7. In the art of removing ink from printed paper, the improvement comprising agitating the paper in an alkali solution to separate the oil and pigment of the ink from the fibre, emulsifying the oil and causing the same to rise to the surface, and removing the emulsified oil from the surface of the stock.

8. In the art of removing ink from printed paper, the improvement comprising treating the macerated paper with a hot alkali solution to separate the oil and pigment of the ink from the fibre, agitating the stock in a hot saturated solution of soap, cooling the stock to throw the soap out of solution, and removing the soap and oil from the stock.

9. In the art of removing ink from printed paper, the improvement comprising treating the macerated paper with an alkali solution at a temperature of about 140° F. to separate the oil and pigment of the ink from the fibre, adding sufficient soap to the alkali-treated stock to form a substantially saturated solution of soap and agitating the stock, adding cold water to the stock to reduce its temperature to about 100° F. whereby more or less of the soap is thrown out of solution, and agitating the stock and removing the bubbles of soap, oil and pigment which rise to the surface.

10. In the art of removing ink from printed paper, the improvement comprising agitating the macerated paper in a solution of soda ash containing enough of the latter to make the stock alkaline, at a temperature of about 140° F., to separate the oil and pigment of the ink from the fibre; adding sufficient soap to the alkali-treated stock to form a substantially saturated solution of soap and agitating the stock, adding cold water to the stock to reduce its temperature to a point at which more or less of the soap is thrown out of solution, and agitating the stock and removing the bubbles of soap, oil and pigment from its surface.

11. In the art of removing ink from printed paper, the improvement comprising treating the macerated paper with a hot alkali solution to separate the oil and pigment of the ink from the fibre, agitating the stock in a hot saturated solution of soap to emulsify the oil, cooling the soap solution to throw out the soap, agitating the stock and removing the bubbles of emulsified oil from its surface, and washing the stock.

12. In the art of removing ink from printed paper, the improvement comprising treating the macerated paper with an alkali solution to separate the oil and pigment of the ink from the fibre, agitating the stock in a solution of soap and causing the oil to rise to the surface in the form of bubbles, removing the bubbles and washing the stock, removing the water from the stock, mixing the resulting pulp with new pulp, and utilizing the mixture for making paper.

13. In the art of removing ink from printed paper, the improvement comprising agitating the paper in an alkali solution to separate the oil and pigment of the ink from the fibre, emulsifying the oil and removing the same from the stock, washing the stock, and utilizing the stock for making paper.

14. In the art of removing ink from printed paper, the improvement comprising treating the macerated paper with a hot alkali solution to separate the oil and pigment of the ink from the fibre, agitating the stock in a hot saturated solution of soap, cooling the stock to throw the soap out of solution, agitating the stock and removing the oily bubbles from the surface, washing the stock, and converting the stock into paper.

15. In the art of removing ink from printed paper, the improvement comprising treating the macerated paper with an alkali solution at a temperature of about 140° F. to separate the oil and pigment of the ink from the fibre, adding sufficient soap to the alkali-treated stock to form a substantially saturated solution of soap and agitating the stock, adding cold water to the stock to reduce its temperature to about 100° F. whereby more or less of the soap is thrown out of solution, agitating the stock and removing the bubbles of soap, oil and pigment from the surface of the stock, washing the stock, and converting the washed stock into paper.

In testimony whereof we hereto affix our signatures.

ARTHUR F. ALLEN.
ALFRED F. McCOY.
ROBERT O. STERNBERGER.